United States Patent
Park

(10) Patent No.: US 10,853,235 B2
(45) Date of Patent: Dec. 1, 2020

(54) MEMORY CONTROLLER AND MEMORY SYSTEM HAVING THE SAME

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/150,647

(22) Filed: Oct. 3, 2018

(65) Prior Publication Data

US 2019/0278705 A1  Sep. 12, 2019

(30) Foreign Application Priority Data

Mar. 8, 2018 (KR) .......... 10-2018-0027527

(51) Int. Cl.
*G06F 12/02* (2006.01)
*G06F 12/1009* (2016.01)
*G06F 3/06* (2006.01)

(52) U.S. Cl.
CPC ...... *G06F 12/0246* (2013.01); *G06F 12/0292* (2013.01); *G06F 12/1009* (2013.01); *G06F 3/0659* (2013.01); *G06F 2212/1016* (2013.01); *G06F 2212/7208* (2013.01)

(58) Field of Classification Search
CPC ......... G06F 12/0246; G06F 2212/1016; G06F 2212/7208; G06F 3/0659; G06F 9/3855
USPC ............................................ 711/103
See application file for complete search history.

(56) References Cited

U.S. PATENT DOCUMENTS

2013/0212318 A1* 8/2013 Toelkes ............... G06F 12/0246
711/103
2016/0026565 A1* 1/2016 Vali ....................... G06F 12/023
711/154

FOREIGN PATENT DOCUMENTS

KR   1020140031515   3/2014
KR       101739431   5/2017

* cited by examiner

*Primary Examiner* — Than Nguyen
(74) *Attorney, Agent, or Firm* — IP & T Group LLP

(57) ABSTRACT

A memory controller for use in a memory system includes: a central processing unit configured to generate commands in response to a request received from a host; and a queue controller configured to queue the commands in order of similar operation times.

3 Claims, 12 Drawing Sheets

FIG. 11

MEMORY CONTROLLER AND MEMORY SYSTEM HAVING THE SAME

CROSS-REFERENCE TO RELATED APPLICATION

The present application claims priority under 35 U.S.C. § 119(a) to Korean patent application number 10-2018-0027527, filed on Mar. 8, 2018, the entire disclosure of which is incorporated herein by reference in its entirety.

BACKGROUND

1. Field of Invention

The present disclosure generally relates to a memory controller and a memory system having the same, and, more particularly, to a memory controller capable of performing a multi-plane operation and a memory system having the same.

2. Description of Related Art

A memory device may store data or output data. For example, the memory device may be configured as a volatile memory device in which stored data is extinguished when the supply of power is interrupted. The memory device may also be configured as a nonvolatile memory device in which stored data is retained even when the supply of power is interrupted. The memory device may include a memory cell array for storing data, a peripheral circuit for performing various operations such as program, read, and erase operations, and a control logic for controlling the peripheral circuit.

A memory controller may control data communication between a host and the memory device.

The memory device may communicate with the memory controller through a channel. For example, a data output buffer in the peripheral circuit included in the memory device may output data read from the memory device through the channel.

SUMMARY

Embodiments provide a memory controller capable of reducing the time required to perform a multi-plane operation by queuing commands according to operating characteristics and a memory system having the memory controller.

In accordance with an aspect of the present disclosure, there is provided a memory controller including: a central processing unit configured to generate commands in response to a request received from a host; and a queue controller configured to queue the commands in order of similar operation times.

In accordance with another aspect of the present disclosure, there is provided a memory controller including: an operation table configured to store operation information on various operations; a command queue controller configured to match commands performed in the same memory device according to an address, and queue the matched commands, based on the operation information; and a command register configured to sequentially store and output the queued commands.

In accordance with still another aspect of the present disclosure, there is provided a memory system including: a memory device including a plurality of planes; and a memory controller configured to, when a request is received from a host, generate commands to be performed in the planes, and queue the commands for operations having similar operation times to be simultaneously performed in the planes.

In accordance with still another aspect of the present disclosure, there is provided a memory system including: a memory device including a plurality of planes; and a controller suitable for queuing commands in order of execution times and controlling the memory device to perform operations to the planes according to the queued commands such that operations having ending operation times close to one another are simultaneously performed to the planes among the operations.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 11 is a diagram illustrating an embodiment of a command matching operation and a command queuing operation shown in FIG. 10.

DETAILED DESCRIPTION

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 1:
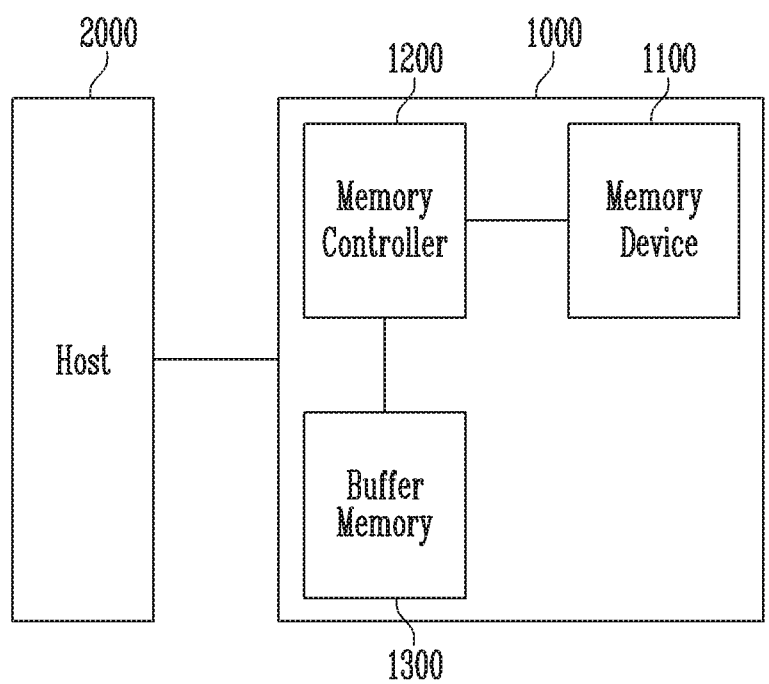
FIG. 1 is a schematic block diagram illustrating a memory system.

FIG. 1 is a diagram illustrating a memory system.

Referring to FIG. 1, the memory system 1000 may include a memory device 1100 for storing data, a buffer memory 1300 for temporarily storing data necessary for an operation of the memory system 1000, and a memory controller 1200 for controlling the memory device 1100 and the buffer memory 1300 under the control of a host 2000.

The host 2000 may communicate with the memory system 1000, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The memory device 1100 may be implemented as a volatile memory device in which data is extinguished when the supply of power is interrupted or a nonvolatile memory device in which data is retained even when the supply of power is interrupted. The memory device 1100 may perform a program operation, a read operation or an erase operation under the control of the memory controller 1200. For example, in a program operation, the memory device 1100 may receive a command, an address, and data from the memory controller 1200, and perform the program operation. In a read operation, the memory device 1100 may receive a command and an address from the memory controller 1200, and output read data to the memory controller 1200. To this end, the memory device 1100 may include an input/output circuit for inputting/outputting data.

The memory controller 1200 may control the overall operations of the memory system 1000, and control data exchange between the host 2000 and the memory device 1100. For example, the memory controller 1200 may program, read or erase data by controlling the memory device 1100 in response to a request from the host 2000. Also, the memory controller 1200 may receive data and a logical address from the host 2000, and translate the logical address into a physical address indicating an area in which data in the memory device 1100 is to be actually stored. Also, the memory controller 1200 may store, in the buffer memory 1300, a logical-to-physical address mapping table that establishes a mapping relationship between the logical address and the physical address.

The memory controller 1200 may generate commands in response to requests received from the host 2000. Also, the memory controller 1200 may match commands that can be simultaneously executed according to an address of the memory device 1100, and determine an execution order of the commands according to the operation information. For example, the memory controller 1200 may queue commands such that operations having similar operation times can be performed simultaneously. For example, the memory controller 120 may queue commands such that operations having ending times close to one another can be performed simultaneously. For example, the memory controller 1200 may queue commands according to Gray codes of data stored in memory cells of the memory device 1100. A Gray code is a code assigning to each of a contiguous set of integers, or to each member of a circular list, a word of symbols such that no two code words are identical and each two adjacent code words differ by exactly one symbol. Therefore, for example, the memory controller 1200 may control the memory device 1100 to simultaneously perform operations to planes included therein. When a plurality of operations having similar operation times are simultaneously performed to a plurality of planes, a waiting time is decreased as compared with when operations having different operation times are simultaneously performed. Hence, by queuing the commands according to their operation times and performing simultaneously those command operations which have similar operation times the total operation time can be decreased. Thus, in accordance with an embodiment of the present invention, operations having similar characteristics such as similar operation times are performed simultaneously to various planes of a memory system so that a waiting time can be decreased.

By contrast, in accordance with conventional memory systems and their operation, operations having different operation times are simultaneously performed to a plurality of planes, and as a result data of a plane to which the operation is first ended cannot be outputted until other operations to planes having a longer operation time are also ended.

The buffer memory 1300 may be used as a working memory or cache memory of the memory controller 1200, and store system data used in the memory system 1000 in addition to the above-described information. In some embodiments, the buffer memory 1300 may include a Double Data Rate Synchronous Dynamic Random-access Memory (DDR SDRAM), a Low Power Double Data Rate 4 (LPDDR4) SDRAM, a Graphics Double Data Rate (GDDR) SDRAM, a Low Power DDR (LPDDR), a Rambus Dynamic Random-access Memory (RDRAM), etc.

Figure 2:
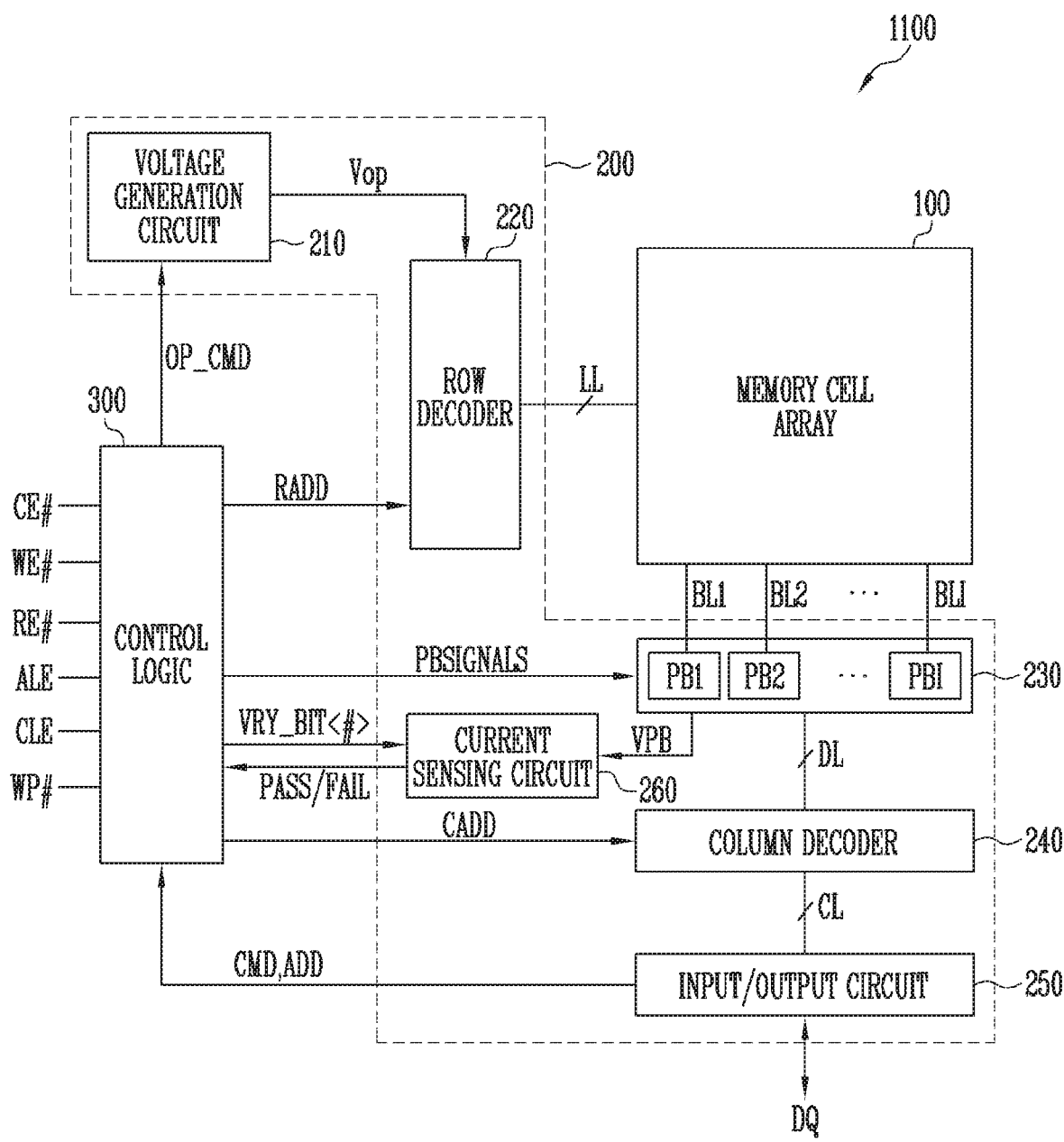
FIG. 2 is a diagram illustrating in detail a memory device shown in FIG. 1.

FIG. 2 is a diagram illustrating in detail the memory device of FIG.

Referring to FIG. 2, the memory device 1100 may be implemented as a volatile memory device or a nonvolatile memory device. In FIG. 2, a nonvolatile memory device is illustrated as an example, but this embodiment is not limited to the nonvolatile memory device.

The memory device 1100 may include a memory cell array 100 that stores data. The memory device 1100 may include a peripheral circuit 200 configured to perform a program operation for storing data in the memory cell array 100, a read operation for outputting the stored data, and an erase operation for erasing the stored data. The memory device 1100 may include a control logic 300 that controls the peripheral circuit 200 under the control of the memory controller 1200 of FIG. 1.

The memory cell array 100 includes a plurality of memory cells for storing data. For example, the memory cell array 100 may include one or more planes, and each of the planes may include one or more memory blocks. Each of the memory blocks may include a plurality of memory cells. A structure including a plurality of planes may be referred to as a multi-plane structure. User data and various information necessary for an operation of the memory device 1100 may be stored in the memory blocks. The memory blocks may be implemented in a two-dimensional or three-dimensional structure. Recently, memory blocks having a three-dimensional structure have been mainly used so as to improve the degree of integration. Memory blocks having the two-dimensional structure may include memory cells arranged in parallel to a substrate, and memory blocks having the three-dimensional structure may include memory cells stacked vertically to a substrate.

The peripheral circuit 200 may be configured to perform program, read, and erase operations under the control of the control logic 300. For example, the peripheral circuit 200 may include a voltage generation circuit 210, a row decoder 220, a page buffer group 230, a column decoder 240, an input/output circuit 250, and a current sensing circuit 260.

The voltage generation circuit 210 may generate various operating voltages Vop used for program, read, and erase operations in response to an operation signal OP_CMD output from the control logic 300. For example, the voltage generation circuit 210 may generate a program voltage, a verify voltage, a pass voltage, a read voltage, an erase voltage, and the like under the control of the control logic 300.

The row decoder 220 may transfer the operating voltages Vop to local lines LL connected to a selected memory block among the memory blocks of the memory cell array 100 in response to a row address RADD. The local lines LL may include local word lines, local drain select lines, and local source select lines. In addition, the local lines LL may include various lines such as a source line, which are connected to the memory block.

The page buffer group 230 may be connected via bit lines BL1 to BLI to the memory blocks of the memory cell array 100. The page buffer group 230 may include a plurality of page buffers PB1 to PBI connected to corresponding bit lines BL1 to BLI. The page buffers PB1 to PBI may operate in response to page buffer control signals PBSIGNALS. For example, the page buffers PB1 to PBI may temporarily store data received through the bit lines BL1 to BLI, or sense voltages or currents of the bit lines BL1 to BLI in a read or verify operation.

The column decoder 240 may transfer data between the input/output circuit 250 and the page buffer group 230 in response to a column address CADD. For example, the column decoder 240 may exchange data with the page buffers PB1 to PBI through data lines DL, or exchange data with the input/output circuit 250 through column lines CL.

The input/output circuit 250 may receive a command CMD, an address ADD, and data DATA from the memory controller 1200 of FIG. 1 through an input/output pad DQ, and output read data to the memory controller 1200 through the input/output pad DQ. For example, the input/output circuit 250 may transfer the command CMD and the address ADD, which are received from the memory controller 1200, to the control logic 300, or exchange the data DATA with the column decoder 240.

In a read operation or a verify operation, the current sensing circuit 260 may generate a reference current in response to a permission bit VRY_BIT<#>, and output a pass signal PASS or a fail signal FAIL by comparing a sensing voltage VPB received from the page buffer group 230 with a reference voltage generated by the reference current.

The control logic 300 may receive the command CMD and the address ADD in response to signals receives through CE#, WE#, RE#, ALE, CLE, ad WP# pads. The control logic 300 may control the peripheral circuit 200 by outputting the operation signal OP_CMD, the row address RADD, the page buffer control signals PBSIGNALS, and the permission bit VRY_BIT<#> in response to the command CMD and the address ADD. The control logic 300 may determine whether the verify operation has passed or failed in response to the pass or fail signal PASS or FAIL.

Figure 3:
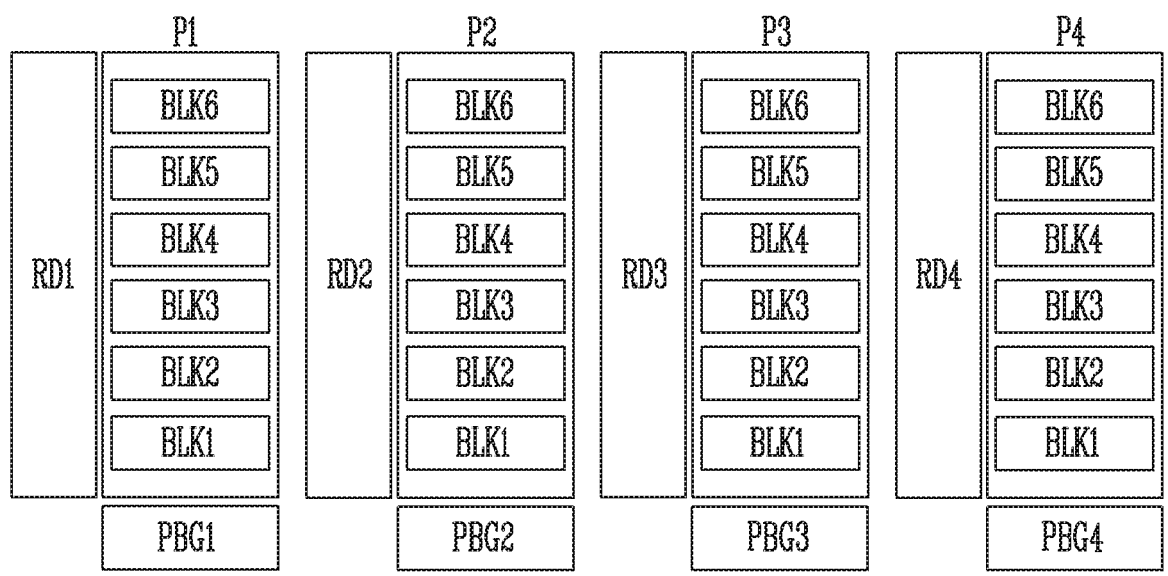
FIG. 3 is a diagram illustrating a multi-plane structure.

FIG. 3 is a diagram illustrating a multi-plane structure.

Referring to FIG. 3, the memory device 1100 having the multi-plane structure may include a plurality of planes P1 to P4.

For example, first to fourth planes P1 to P4 may be included in one memory device 1100. Although four planes are illustrated in FIG. 3, the number of planes is not limited thereto.

The first to fourth planes P1 to P4 may be connected to row decoders RD1 to RD4 and page buffer groups PBG1 to PBG4, respectively, and each of the first to fourth planes P1 to P4 may independently operate. For example, the first plane P1 may operate by being connected to a first row decoder RD1 and a first page buffer group PBG1, the second plane P2 may operate by being connected to a second row decoder RD2 and a second page buffer group PBG2, the third plane P3 may operate by being connected to a third row decoder RD3 and a third page buffer group PBG3, and the fourth plane P4 may operate by being connected to a fourth row decoder RD4 and a fourth page buffer group PBG4. The first to fourth row decoders RD1 to RD4 and the first to fourth page buffers PBG1 to PBG4 may be controlled by the control logic 300 of FIG. 2. The first to fourth planes P1 to P4 may be operated simultaneously.

For example, in a read operation, the first to fourth row decoders RD1 to RD4 may apply simultaneously read voltages to at least one memory block selected in each of the first to fourth planes P1 to P4 in response to received row addresses. Then the first to fourth page buffer groups PBG1 to PBG4 may temporarily store read data by sensing voltages or currents of bit lines connected to the first to fourth planes P1 to P4. When the operations of sensing the voltages or current of the bit lines connected to the first to fourth planes P1 to P4 are completed, the read data which are temporarily stored in the first to fourth page buffer groups PBG1 to PBG4 may be sequentially transferred through the input/output circuit 250 of FIG. 2. For example, the read data which are temporarily stored in the first page buffer group PBG1 may be transferred first, and then the read data which are temporarily stored in the second to fourth page buffer groups PBG2 to PBG4 may be transferred sequentially.

Figure 4:
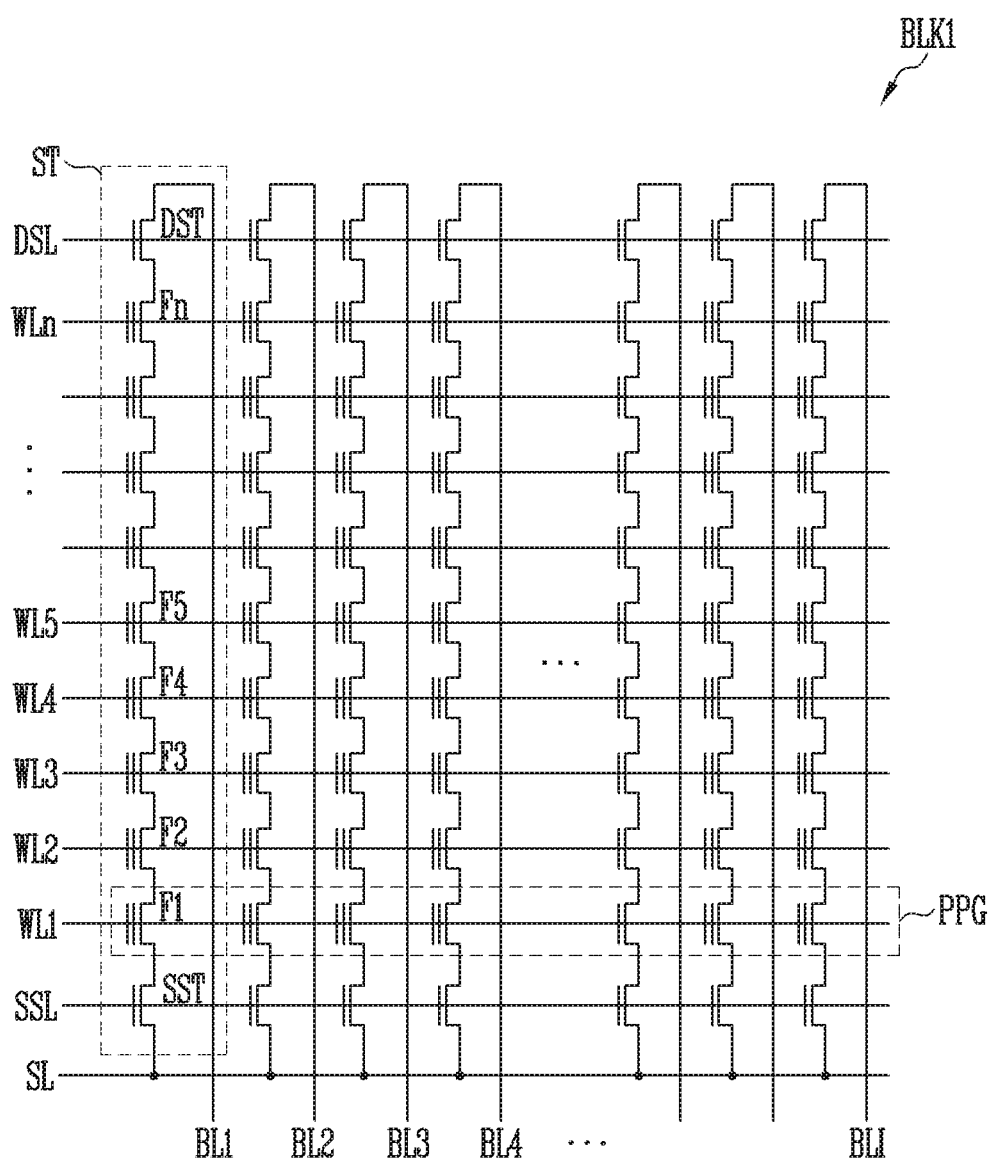
FIG. 4 is a circuit diagram illustrating a memory block shown in FIG. 3.

FIG. 4 is a circuit diagram illustrating an example configuration of the memory block of FIG. 3.

Referring to FIG. 4, the plurality of memory blocks BLK1 to BLK6 shown in FIG. 3 may be configured identically to one another, and therefore, a first memory block BLK1 among the memory blocks BLK1 to BLK6 will be described as an example.

The first memory block BLK1 may include a plurality of cell strings ST connected between respective bit lines BL1 to BLI and a common source line SL. For example, the cell strings ST may be respectively connected to the bit lines BL1 to BLI, and be commonly connected to the source line SL. Since the cell strings ST are configured similarly to one another, and therefore, a cell string ST connected to a first bit line BL1 will be described as an example.

Each of the cell string ST may include a source select transistor SST, first to nth memory cells F1 to Fn (n is a positive integer), and a drain select transistor DST, which are connected in series between the source line SL and the first bit line BL1. The number of source select transistors SST and drain select transistors DST is not limited to that shown in FIG. 4. The source select transistor SST may be connected between the source line SL and the first memory cell F1. The first to nth memory cells F1 to Fn may be connected in series between the source select transistor SST and the drain select transistor DST. The drain select transistor DST may be connected between the nth memory cell Fn and the first bit line BL1. Although not shown in the drawing, dummy cells may be further connected between the memory cells F1 to Fn or between the source select transistor SST and the drain select transistor DST.

Gates of the source select transistors SST included in different cell strings ST may be connected to a source select line SSL, gates of the first to nth memory cells F1 to Fn included in different cell strings ST may be connected to first to nth word lines WL1 to WLn, and gates of the drain select transistors DST included in different cell strings may be connected to a drain select line DSL. A group of memory cells connected to each of the word lines WL1 to WLn is referred to as a page PG. For example, a group of the first memory cells F1 connected to the first word line WL1 among the memory cells F1 to Fn included in different cell strings ST may become one physical page PPG. Program and read operations may be performed in unit of physical pages PPG.

Figure 5:
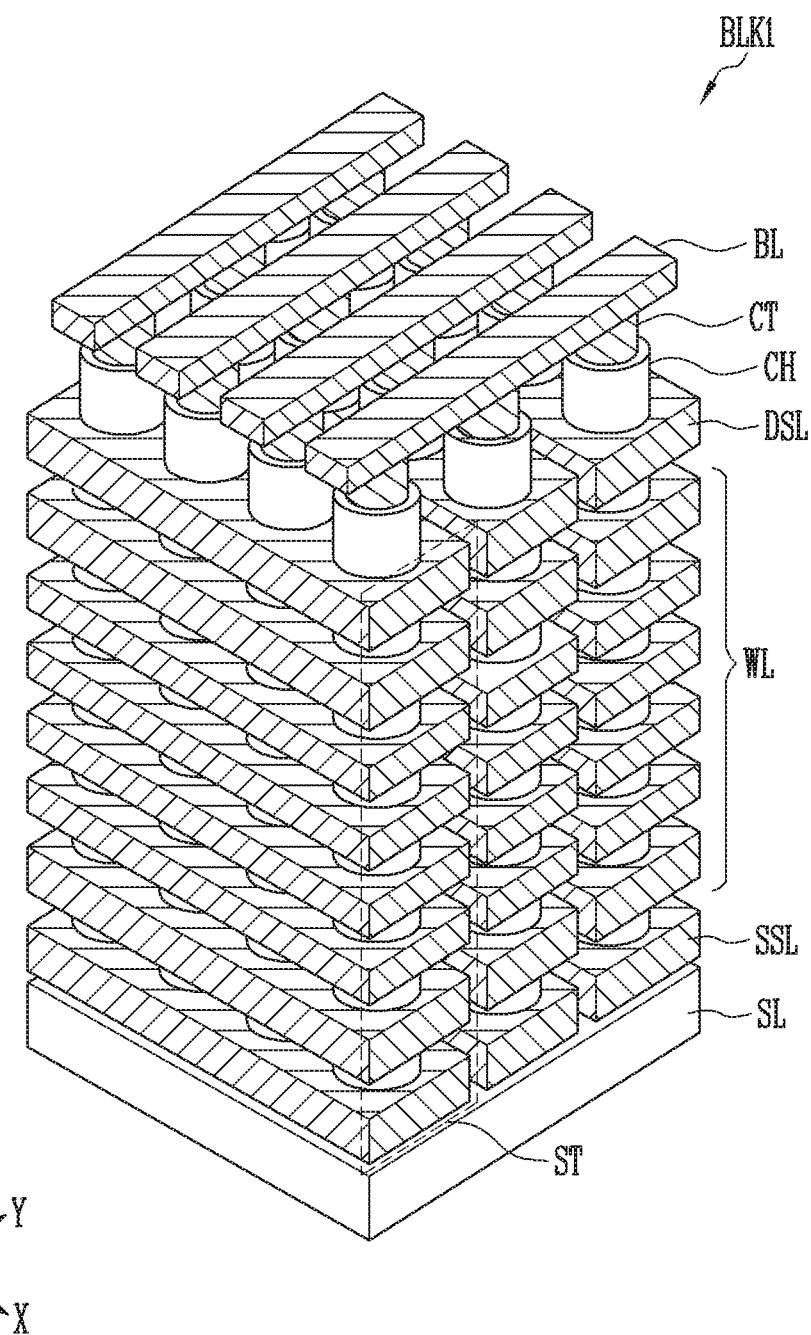
FIG. 5 is a diagram illustrating an embodiment in which the memory block of FIG. 3 is three-dimensionally configured.

FIG. 5 is a diagram illustrating an embodiment in which the memory block of FIG. 3 is three-dimensionally configured.

Referring to FIG. 5, the first memory block BLK1 implemented in the three-dimensional structure may be formed in an I shape on a substrate in a direction (Z direction) vertical to the substrate, and include a plurality of cell strings ST arranged between bit lines BL and a source line SL. Alternatively, a well may be formed instead of the source line SL. This structure is also referred to as a Bit Cost Scalable (BiCS) structure. For example, when the source line SL is formed in parallel to the substrate above the substrate, the cell strings ST having the BiCS structure may be formed in the direction (Z direction) vertical to the substrate on the top of the source line SL.

More specifically, the cell strings ST may be arranged in a first direction (X direction) and a second direction (Y direction). The cell strings ST may include source select lines SSL, word lines WL, and drain select lines DSL, which are stacked while being spaced apart from each other. The number of source select lines SSL, word lines WL, and drain select lines DSL is not limited to that shown in the drawing, and may be changed depending on the memory device 100. The cell strings ST may include vertical channel layers CH vertically penetrating the source select lines SSL, the word lines WL, and the drain select lines DSL, and the bit lines BL that are in contact with the tops of the vertical channel layers CH protruding to the tops of the drain select lines DSL and extend in the second direction (Y direction). Memory cells may be formed between the word lines WL and the vertical channel layers CH. Contact plugs CT may be further formed between the bit lines BL and the vertical channel layers CH.

Figure 6:
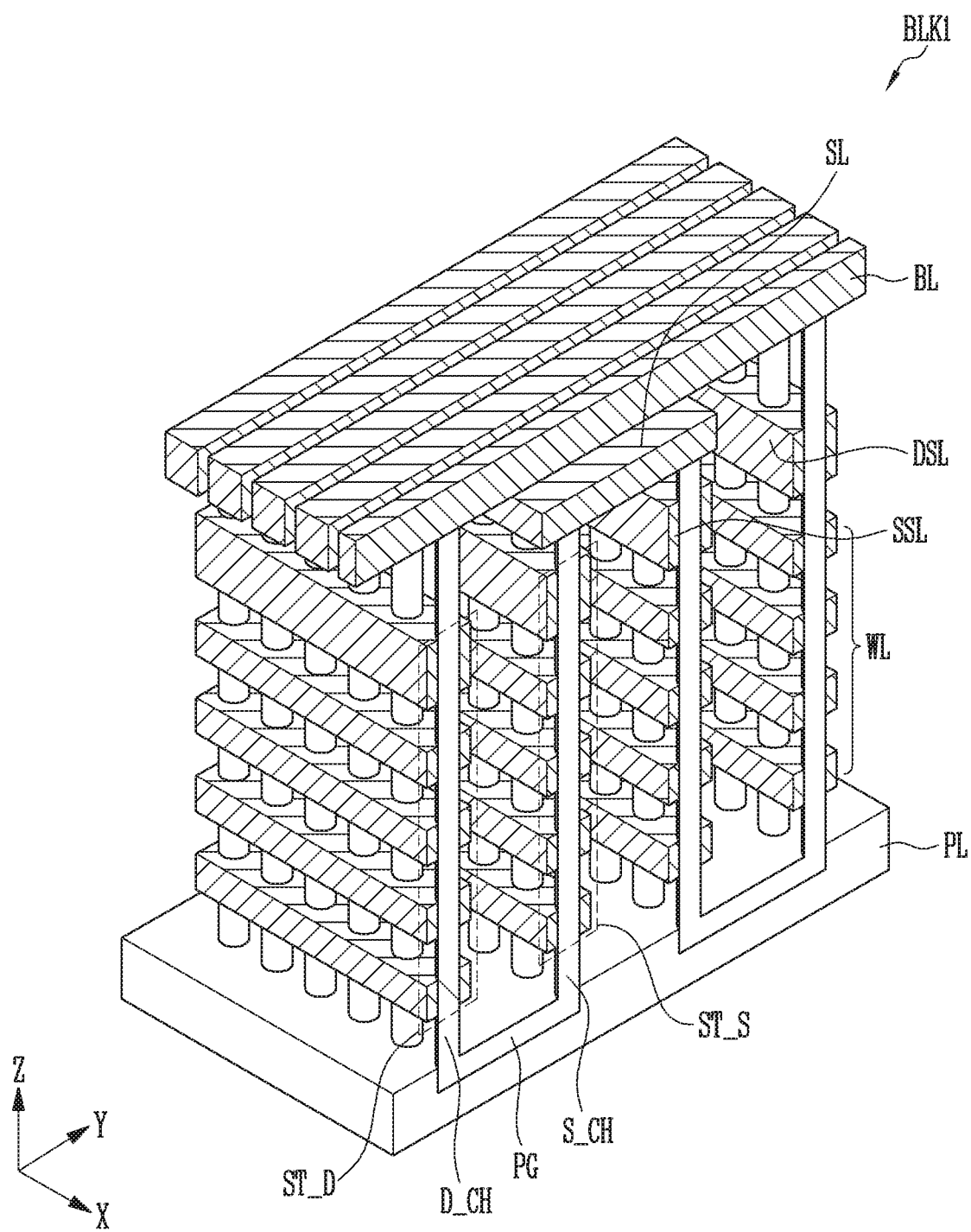
FIG. 6 is a diagram illustrating another embodiment in which the memory block of FIG. 3 is three-dimensionally configured.

FIG. 6 is a diagram illustrating another embodiment in which the memory block of FIG. 3 is three-dimensionally configured.

Referring to FIG. 6, the first memory block BLK1 having the three-dimensional structure may be formed on a substrate in a U shape in a direction (Z direction) vertical to the substrate, and include source strings ST_S and drain strings ST_D, which are connected between bit lines BL and source lines SL and form pairs. The source string ST_S and the drain string ST_D may be connected to each other through a pipe gate PG to form a U-shaped structure. The pipe gate PG may be formed in a pipe line PL. More specifically, the source strings ST_S may be formed vertically to the substrate between the source line SL and the pipe line PL, and the drain strings ST_D may be formed vertically to the substrate between the bit lines BL and the pipe line PL. This structure is also referred to as a Pipe-shaped Bit Cost Scalable (P-BiCS) structure.

More specifically, the drain strings STD and the source strings ST_S may be arranged in a first direction (X direction) and a second direction (Y direction). The drain strings ST_D and the source strings ST_S may be alternately arranged along the second direction (Y direction). The drain strings ST_D may include word lines WL and a drain select line DSL, which are stacked while being spaced apart from each other, and drain vertical channel layers D_CH that vertically penetrate the word lines WL and the drain select line DSL. The source strings ST_S may include word lines WL and a source select line SSL, which are stacked while being spaced apart from each other, and source vertical channel layers S_CH that vertically penetrate the word lines WL and the source select line SSL. The drain vertical channel layers D_CH and the source vertical channel layers S_CH may be connected to each other by the pipe gate PG in the pipe line PL. The bit lines BL may be in contact with the tops of the drain vertical channel layers D_CH protruding to the top of the drain select line DSL, and extend in the second direction (Y direction).

The first memory block BLK1 may be implemented in various other structures in addition to the structures described in FIGS. 4 to 6.

Figure 7:
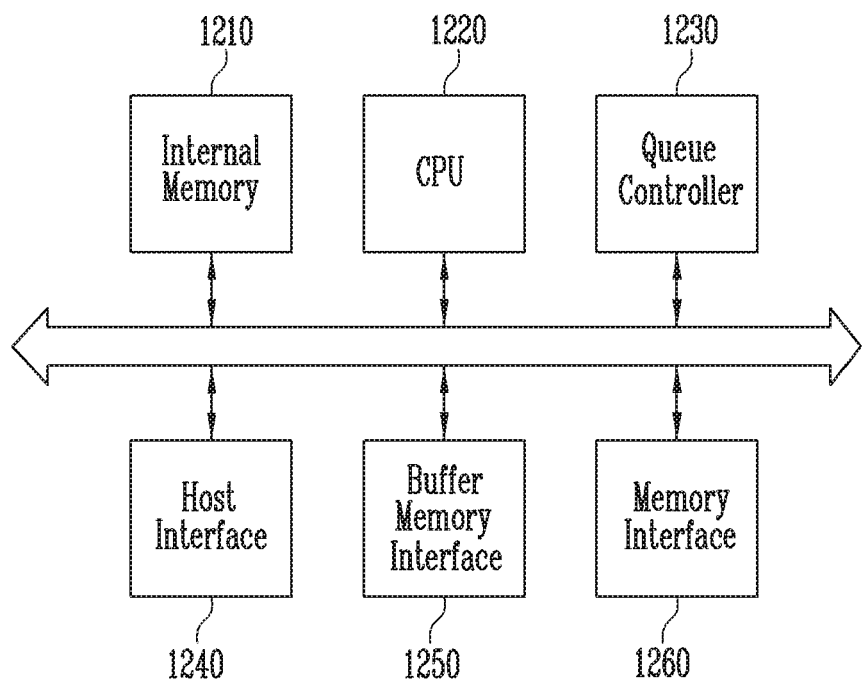
FIG. 7 is a diagram illustrating in detail a memory controller of FIG.

FIG. 7 is a diagram illustrating in detail the memory controller of FIG. 1.

Referring to FIG. 7, the memory controller 120 may include an internal memory 1210, a central processing unit (CPU) 1220, a queue controller 1230, a host interface 1240, a buffer memory interface 1250, and a memory interface 1260.

The internal memory 1210 may store various information necessary for an operation of the memory controller 1200. For example, the internal memory 1210 may include a logical and physical address map table. The internal memory 1210 may be configured with at least one of a Random-Access Memory (RAM), a Dynamic RAM (DRAM), a Static RAM (SRAM), and a Tightly Coupled Memory (TCM).

The CPU 1220 may perform various software and algorithms for controlling the memory device 1100 or generate various commands. When a request is received from the host 2000 of FIG. 1, the CPU 1220 may generate a command in response to the received command, and transmit the generated command to the queue controller 1230.

The queue controller 1230 may receive a command from the CPU 1220, and queue the received command according to an address and operation information. For example, the queue controller 1230 may queue commands such that operations having similar operation times can be performed simultaneously. For example, the queue controller 1230 may queue commands such that operations having ending times close to one another can be performed simultaneously.

The host interface 1240 may exchange a command, an address, data, and the like between the memory controller 1200 and the host 2000 of FIG. 1. For example, the host interface 1240 may receive a request, an address, data, and the like from the host 2000 of FIG. 1, and output data read from the memory device 1100 of FIG. 1 to the host 2000. The host interface 1240 may communicate with the host 2000 by using a protocol such as a Peripheral Component Interconnect express (PCIe), an Advanced Technology Attachment (ATA), a Serial ATA (SATA), a Parallel ATA (PATA), a Serial Attached SCSI (SAS) or a Non-Volatile Memory express (NVMe). The host interface 1240 is not limited to the above-described example, and may include various interfaces such as a Universal Serial Bus (USB), a Multi-Media Card (MMC), an Enhanced Small Disk Interface (ESDI), and Integrated Drive Electronics IDE.

The buffer memory interface 1250 may transmit data between the CPU 1220 and the buffer memory 1300 of FIG. 1. When the buffer memory 1300 is included in the memory controller 1200, the buffer memory interface 1250 may be omitted.

The memory interface 1260 may exchange a command, an address, data, and the like between the memory controller 1200 and the memory device 1100. For example, the memory interface 1260 may transmit a command, an address, data, and the like to the memory device 1100 through a channel, and receive data and the like from the memory device 1100.

Figure 8:
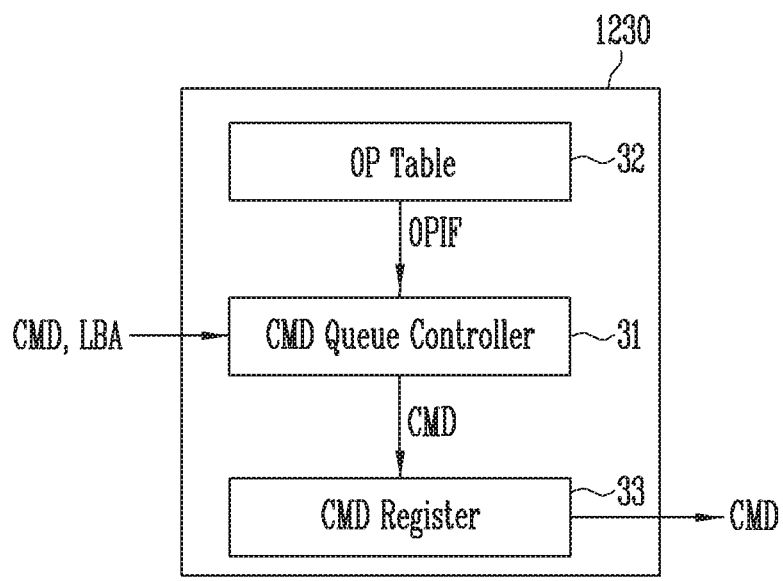
FIG. 8 is a diagram illustrating in detail a queue controller of FIG. 7.

FIG. 8 is a diagram illustrating in detail the queue controller of FIG. 7.

Referring to FIG. 8, the queue controller 1230 may include a command queue controller (CMD queue controller) 31, an operation table (OP table) 32, and a command register (CMD register) 33.

The CMD queue controller 31 may receive commands CMD and an address LBA, and queue the commands CMD according to the address LBA and operation information OPIF received from the OP table 32. That is, the CMD queue controller 31 may queue the commands CMD into the CMD register 33 according to an execution order such that commands for operations having similar operation times among operations to be performed in the memory device 1100 can be simultaneously executed. The address LBA may be a logical block address received from the host 2000 of FIG. 1.

The OP table 32 stores operation information OPIF, and outputs operation information OPIF in response to a request of the CMD queue controller 31. The operation information OPIF may include program operation information, read operation information, and erase operation information. The operation information OPIF may include information on operating methods of program, read, and erase operations.

The program operation information may include information on a single level cell (SLC) method and/or a multi-level cell (MLC) method. For example, the MLC method may include information on at least one of triple level cell (TLC) method or a quadruple level cell (QLC) method. In addition, the OP table 32 may include program operation information on various program methods.

The read operation information may include information on a SLC method and/or an MLC method. The MLC method may include information on a TLC method and/or a QLC method. Also, since the read operation is performed on each logical page according to a program method, the read operation information may include information on programmed logical pages. For example, the information on programmed logical pages may include least significant bit (LSB) information, central significant bit (CSB) information, and most significant bit (MSB) information. In addition, the OP table 32 may store information on various methods of program, read, and erase operations. The operations may have different operation times for which they are performed in the memory device 1100. For example, LSB, CSB, and MSB read operations may have different operation times according to Gray codes. That is, numbers of read voltages used in the respective read operations may be different according to the Gray codes. A read operation using each read voltage is to be performed, and therefore, the time required to perform the read operation may be lengthened when the number of read voltages increases.

The command register 33 may store sequentially commands CMD queued by the CMD queue controller 31 according to the execution order, and sequentially output the stored commands CMD.

Figure 9:
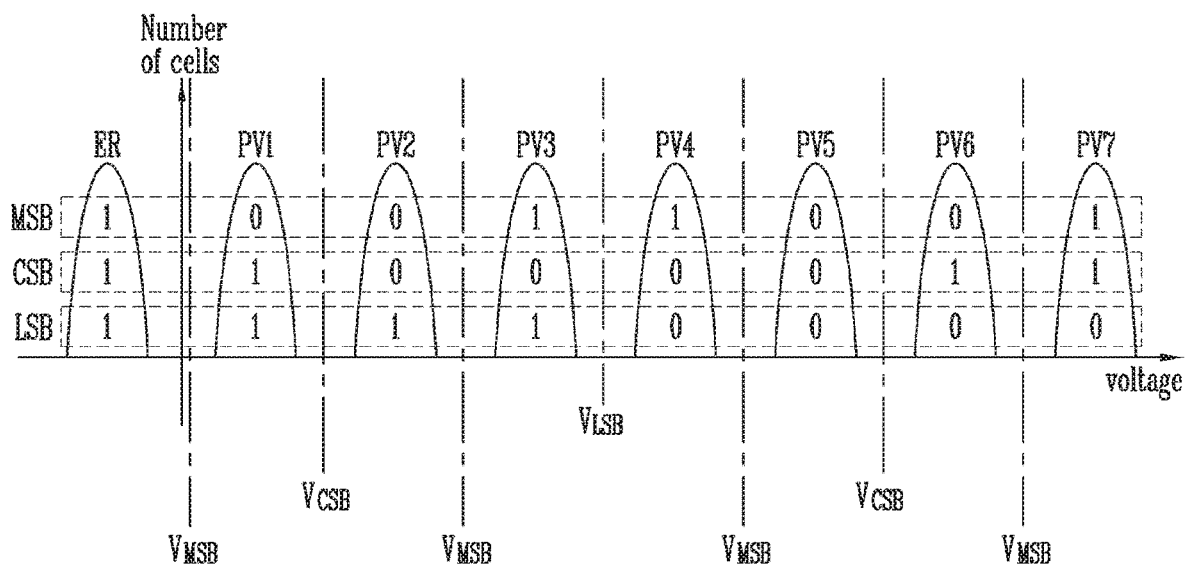
FIG. 9 is a diagram illustrating threshold voltage distributions of memory cells in a triple level cell method.

FIG. 9 is a diagram illustrating threshold voltage distributions of memory cells in a TLC read operation method.

Referring to FIG. 9, in the memory device 1100 to which the MLC method is applied, the number of threshold voltage distributions of memory cells may be four or more. That is, a method in which states of the memory cells are divided into four threshold voltage distributions is referred to as the MLC method. For example, the memory cells may have different data according to an erase state, a first program state, a second program state or a third program state. A method in which states of the memory cells are divided into eight threshold voltage distributions is referred to as the TLC method. A method in which states of the memory cells are divided into sixteen threshold voltage distributions is referred to as the QLC method. This embodiment may be applied to the MLC method, the TLC method, and QLC method. This embodiment may also be applied to a method in which states of the memory cells are divided into sixteen or more threshold voltage distributions.

In FIG. 9, threshold voltage distributions in the TLC method are illustrated as an example.

In the TLC method, the memory cells may have eight threshold voltage distributions. For example, states of the memory cells may be divided into an erase state ER and first to seventh program states PV1 to PV7 according to the threshold voltage distributions. Gray codes may be provided to the memory cells according to the threshold voltage distributions, and the memory cells may be programmed or read according to the Gray codes. In the TLC method, one memory cell is divided into three Gray codes. In the TLC method, the Gray code may include an LSB, a CSB, and an MSB, and the states of the memory cells may be divided into eight states according to combinations of the Gray codes.

For example, the Gray code of the erase state ER may be set to '111,' the Gray code of the first program state PV1 may be set to '110,' and the Gray code of the seventh program state PV7 may be set to '011.' The combinations of the Gray codes may be changed depending on the memory device 1100 of FIG. 1. Therefore, the read voltage used in a read operation may also be changed depending on the Gray codes. The Gray codes shown in FIG. 9 will be described as an example. One LSB read voltage $V_{LSB}$ may be used in an LSB read operation, two CSB read voltages $V_{CSB}$ may be used in a CSB read operation, and four MSB read voltages $V_{MSB}$ may be used in an MSB read operation.

When read operations of the LSB, CSB, and MSB are performed, the read operations are all performed using the set read voltages $V_{LSB}$, $V_{CSB}$, and $V_{MSB}$. Therefore, when the number of read voltages used in a read operation increases, the time required to perform the read operation may increase. In the embodiment of FIG. 9, since one LSB read voltage $V_{LSB}$ is used in the LSB read operation, the time required to perform the read operation may be shortest. Since two CSB read voltages $V_{CSB}$ are used in the CSB read operation, the time required to perform the read operation may be longer than that required to perform the LSB read operation. Since four MSB read voltages $V_{MSB}$ are used in the MSB read operation, the time required to perform the read operation may be longer than that required to perform the CSB read operation.

In the memory device 1100 of FIG. 1 having Gray codes set different from those of FIG. 9, for example, when the number of read voltages used in the CSB read operation is larger than that of read voltages used in the MSB read operation, the time required to perform the CSB read operation may be longer than that required to perform the MSB read operation.

Figure 10:
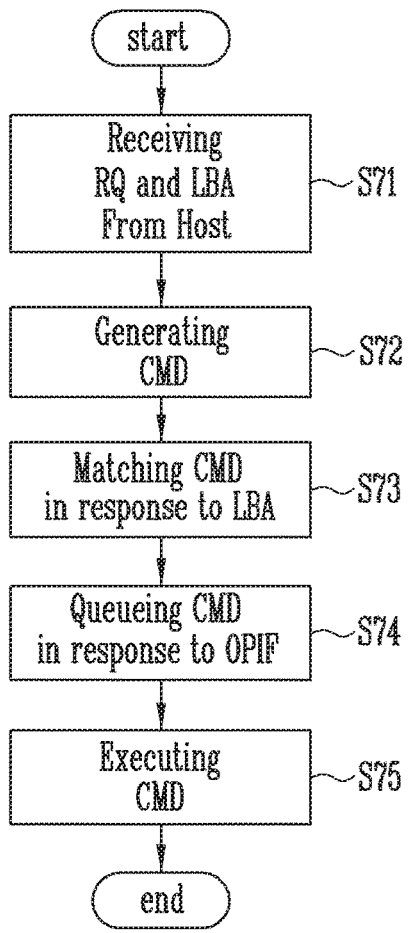
FIG. 10 is a flowchart illustrating an operating method in accordance with an embodiment of the present disclosure.

FIG. 10 is a flowchart illustrating an operating method in accordance with an embodiment of the present disclosure.

A read operation will be described as an example with reference to FIG. 10.

When a read request RQ and an address LBA are received from the host at step S71, the memory controller 1200 may generate commands CMD corresponding to the read request RQ at step S72. For example, the read commands CMD may include an LSB read command, a CSB read command, and an MSB read command.

The memory controller 1200 may match the generated read commands CMD for each address LBA at step S73. For example, the memory controller 1200 may control the memory device 1100 to simultaneously perform operations to a plurality of planes so as to reduce an operation time of the memory system 1000. To this end, the memory controller 1200 may match commands to be executed at the same time, according to their address LBA.

Subsequently, the memory controller 1200 may queue the commands, based on operation information OPIF received from the OP table 32 at step S74. For example, the memory controller 1200 may queue the commands CMD such that commands CMD having similar operation times can be simultaneously executed based on the operation information.

When the commands CMD are queued, the memory controller 1200 may execute the commands CMD according to the queued order at step S75. More specifically, the memory controller 1200 transmits the commands CMD to the memory device 1100 according to the queued order, and may transmit an address LBA matched to each command together with the command CMD.

When the commands CMD and the addresses LBA are all received, the memory controller 1200 may simultaneously perform read operations of the planes. Since commands CMD having similar operation times are executed in each plane, the times at which the read operations of the planes are ended may be similar to one another. When the read operations of the planes are all completed, data read for each plane may be sequentially output to the memory controller 1200.

Among the above-described operations, an embodiment of the operation of step S73 of matching the commands CMD for each address LBA and the operation of step S74) of queuing the matched commands CMD, based on the operation information OPIF will be described as follows.

Figure 11:
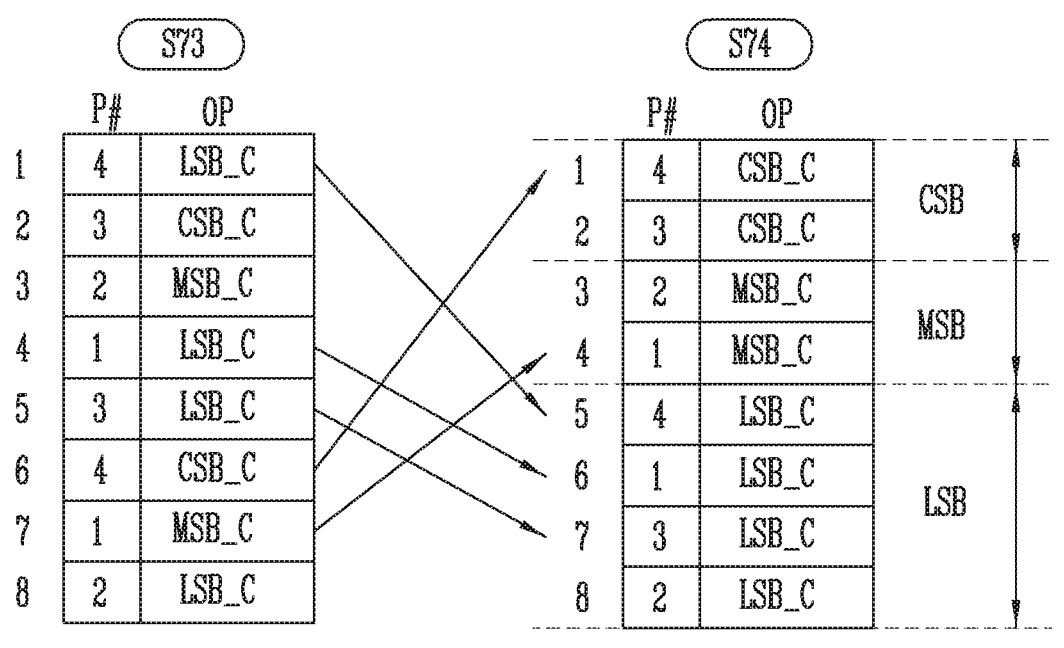

FIG. 11 is a diagram illustrating an embodiment of the command matching operation and the command queuing operation, which are shown in FIG. 10.

Referring to FIG. 11, there is illustrated an embodiment in which four planes are included in one memory device 1100. 'P#' denotes numbers of planes, and 'OP' denotes commands corresponding to an operation to be performed on each plane. In accordance with the embodiment shown in FIG. 11, an LSB read command LSB_C corresponding to a fourth plane P4 may be first output (1), and a CSB read command CSB_C corresponding to a third plane P3 may be then output (2). In this manner, an LSB read command LSB_C corresponding to the second plane P2 may be lastly output (8). That is, common commands to perform the same kind of operation are matched to the plurality of planes P1 to P4 included in the memory device 1100. However, this is not matching performed by considering a read operation time, and hence read data of planes to which read operations are first ended cannot be output until other read operations to the other planes are ended. Therefore, in this embodiment, the output order of the commands may be rearranged by considering the read operation time. That is, in the step S74, the commands may be queued based on the operation information.

Referring to 'S74,' the read operation commands may be queued such that commands having the same operation time or similar operation times are adjacent to each other, based on the operation information. For example, LSB commands LSB_C corresponding to planes on which the LSB read operation is to be performed may be consecutively set, CSB commands CSB_C corresponding to planes on which the CSB read operation is to be performed may be consecutively set, and MSB commands MSB_C corresponding to planes on which the MSB read operation is to be performed may be consecutively set. In accordance with the embodiment of FIG. 11, CSB read commands corresponding to the fourth and third planes P4 and P3 may be set to be consecutively executed (1 and 2), MSB read commands MSB_C corresponding to the second and first planes P2 and P1 may be set to be consecutively executed (3 and 4), and LSB read commands LSB_C corresponding to the fourth, first, third, and second planes P4, P1, P3, and P2 may be set to be consecutively executed (5, 6, 7, and 8).

When the command to be lastly executed among a plurality of matched commands is output, the memory device 1100 may simultaneously perform read operations of selected planes according to received commands and received addresses. For example, when CSB read commands CSB_C corresponding to the fourth and third planes P4 and P3 are received, the memory device 1100 does not immediately receive MSB read commands MSB_C that are next commands corresponding to the second and first planes P2 and P1, but may simultaneously perform CSB read operations of the fourth and third planes P4 and P3 according to the CSB read commands CSB_C that have already received. When both of the CSB read operations of the fourth and third planes P4 and P3 are completed, the memory device 1100 may output data read from the fourth plane P4 to the memory controller 1200, and output data read from the third plane P3 to the memory controller 1200. When all the data read from the fourth and third planes P4 and P3 are outputted, the memory controller 1200 may transmit, to the memory device 1100, the MSB read commands MSB_C that are the next commands and addresses of the second and first planes P2 and P1. A more detailed embodiment will be described later with reference to FIG. 12.

Figure 12:
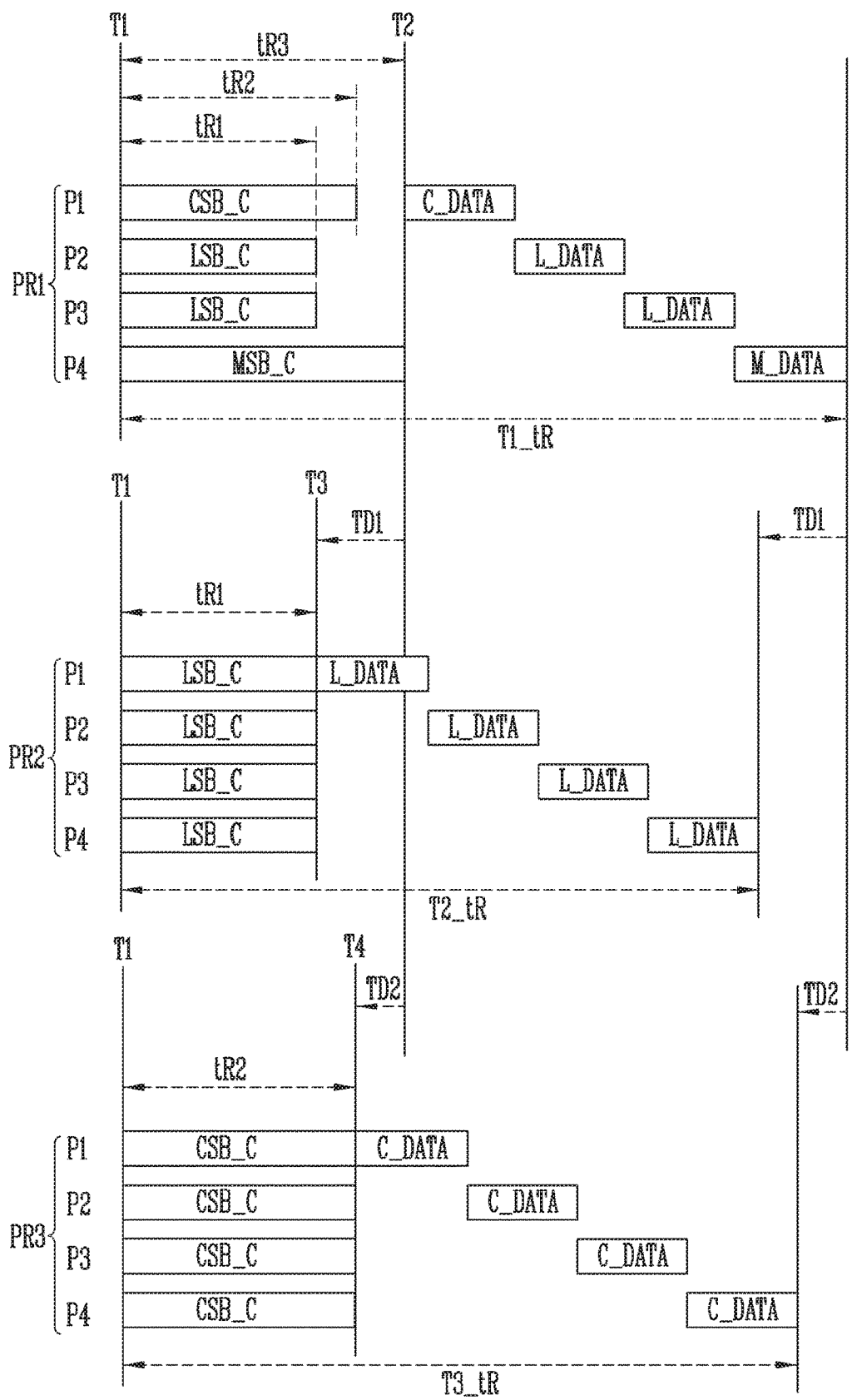
FIG. 12 is a diagram illustrating a read operation time in accordance with an embodiment of the present disclosure.

FIG. 12 is a diagram illustrating a read operation time in accordance with an embodiment of the present disclosure.

In FIG. 12, 'PR1.' indicates a multi-plane operation before this embodiment is applied, and 'PR2' and 'PR3' indicate multi-plane operations to which this embodiment is applied.

Referring to 'PR1,' when operation information of each read operation is not considered in the read operations, a multi-plane operation time required to simultaneously operate first to fourth planes P1 to P4 may be longer. That is, although the first to fourth planes P1 to P4 all perform read operations, when read operations having different read operation times, which as an LSB read operation, a CSB read operation, and an MSB read operation, are simultaneously started at a time point T1, read data of planes to which a read operation is first ended cannot be output until other read operations are ended at a time point T2. This is because, as long as a read operation is being performed to any one of the first to fourth planes P1 to P4 included in one memory device 1100, the memory device 1100 is in a busy state in which it cannot receive any output command.

It is assumed that the time required to perform the LSB read operation is a first time tR1, the time required to perform the CSB read operation is a second time tR2 that is longer than the first time tR1, and the time required to perform the MSB read operation is a third time tR3 that is longer than the second time tR2. A case where the CSB read operation is performed to the first plane P1 according to the CSB read command CSB_C, the LSB read operations are performed to the second and third planes P2 and P3 according to the LSB read command LSB_C, and the MSB read operation is performed to the fourth plane P4 according to the MSB read command MSB_C will be described as an example.

Since the MSB read operation is performed to the fourth plane P4 for the third time tR3, read LSB data L_DATA of the second and third planes P2 and P3 cannot be output even when the LSB read operations performed to the second and third planes P2 and P3 for the first time tR1 are ended. In addition, since the MSB read operation is performed to the fourth plane P4 for the third time tR3, the read CSB data C_DATA of the first plane P1 cannot be output even when the CSB read operation performed to the first plane P1 for the second time tR2 is ended. Therefore, although the read operations of the first to third planes P1 to P3 are ended earlier than that of the fourth plane P4, the read data C_DATA and L_DATA of the first to third planes P1 to P3 cannot be outputted during the third time tR3. The data C_DATA, L_DATA, and M_DATA of the first to fourth planes P1 to P4 may be sequentially outputted only at the end of the third time tR3 when the read operations of the first to fourth planes P1 to P4 are all ended.

In 'PR1,' when assuming that the time required for the first to fourth planes P1 to P4 to start the read operations at the time point T1 and output the read data is a first total time T1_tR, the time required to perform the LSB, CSB, and MSB read operations to the first to fourth planes P1 to P4 may be three times of the first total time T1_tR ((T1_tR)×3). For example, since the time required to output CSB data from the first plane P1 is the first total time T1_tR, the time required to perform each of the LSB and MSB read operations to the first plane P1 and output read data may be the first total time T1_tR, and the time required to completely perform all of the read operations to the first plane P1 may be three times of the first total time T1_tR ((T1_tR)×3).

Next, cases (denoted with 'PR2' and 'PR3' in FIG. 12) to which this embodiment is applied will be described.

'PR2' indicates a case where the LSB read operation is performed to all of first to fourth planes P1 to P4 according to the LSB read command LSB_C. Since the LSB read operation is performed to all of first to fourth planes P1 to P4, the LSB read operation is started at a time point T1. Within the first time tR1, the read operations of the first to fourth planes P1 to P4 are all ended, and therefore, the memory device 1100 including the first to fourth planes P1 to P4 is in a ready state. That is, the time required to end the read operations can be shorter by a first time difference TD1 than the third time tR3 at which the read operations are all ended in 'PR1.' The first time difference TD1 refers to a time difference between the third time tR3 and the first time tR1. Thus, LSB data L_DATA can be sequentially outputted from the first to fourth planes P1 to P4, and accordingly, the time required to start the read operations to the first to fourth planes P1 to P4 and output the read data L_DATA from the first to fourth planes P1 to P4 is a second total time T2_tR that is shorter by the first time difference TD1 than the first total time T1_tR. In this manner, operations having the same operation time or similar operation times can be simultaneously performed in the next read operation (PR3).

'PR3' indicates a case where the CSB read operation is performed to all of first to fourth planes P1 to P4 according to the CSB read command CSB_C. Since the CSB read operation to all of first to fourth planes P1 to P4, the CSB read operation is started at a time point T1. Within the second time tR2, the read operations of the first to fourth planes P1 to P4 are all ended, and therefore, the memory device 1100 including the first to fourth planes P1 to P4 is in the ready state. That is, the time required to end the read operations can be shorter by a second time difference TD2 than the third time tR3 at which the read operations are all ended in 'PR1.' The second time difference TD2 refers to a time difference between the third time tR3 and the second time tR2. Thus, CSB data C_DATA can be sequentially outputted from the first to fourth planes P1 to P4, and accordingly, the time required to start the read operations to the first to fourth planes P1 to P4 and output the read data C_DATA from the first to fourth planes P1 to P4 is a third total time T3_tR that is shorter by the second time difference TD2 than the first total time T1_tR.

Thus, although the time to perform the other MSB read operation to the first to fourth planes P1 to P4 is the first total time T1_tR, the operation time can be shorter by the sum of the first time difference TD1 and the second time difference TD2 than that in 'PR1.'

The embodiment shown in FIG. 12 is an embodiment corresponding to the Gray codes described in FIG. 9. Thus, even when the Gray codes are changed, commands are queued such that operations having the same operation time or similar operation times are simultaneously performed in a plurality of planes, so that the total operation time can be shortened.

Figure 13:
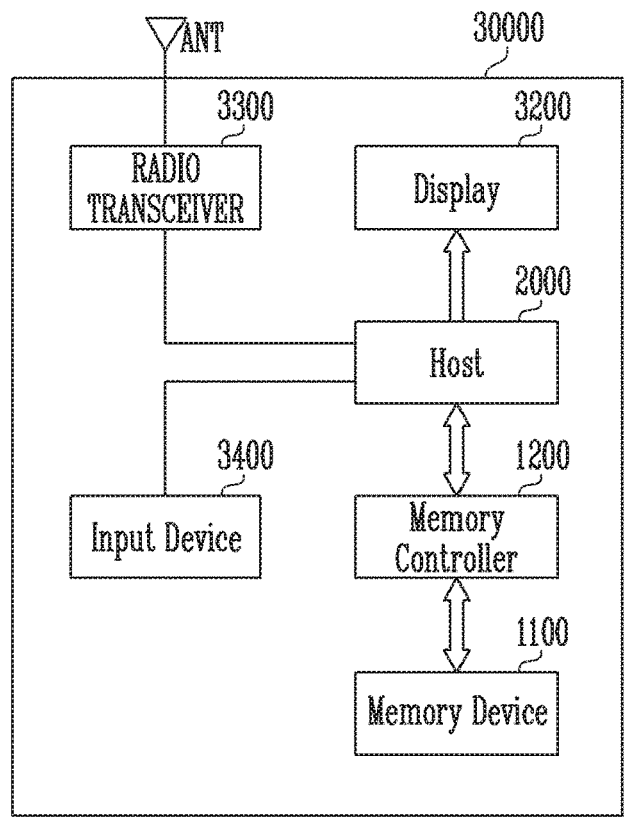
FIG. 13 is a diagram illustrating an embodiment of the memory system including the memory controller shown in FIG. 7.

FIG. 13 is a diagram illustrating another embodiment of the memory system including the memory controller 1200 shown in FIG. 7.

Referring to FIG. 13, the memory system 30000 may be implemented as a cellular phone, a smart phone, a tablet PC, a personal digital assistant (PDA), or a wireless communication device.

The memory system 30000 may include a memory device 1100 and a memory controller 1200 capable of controlling an operation of the memory device 1100. The memory controller 1200 may control a data access operation of the memory device 1100, e.g., a program operation, an erase operation, a read operation, or the like under the control of a host 2000.

Data programmed in the memory device 1100 may be outputted through a display 3200 under the control of the memory controller 1200.

A radio transceiver 3300 may transmit/receive radio signals through an antenna ANT. For example, the radio transceiver 3300 may convert a radio signal received through the antenna ANT into a signal that can be processed by the host 2000. Therefore, the host 2000 may process a signal output from the radio transceiver 3300 and transmit the processed signal to the memory controller 1200 or the display 3200. The memory controller 1200 may transmit the signal processed by the host 2000 to the semiconductor memory device 1100. Also, the radio transceiver 3300 may convert a signal output from the host 2000 into a radio signal, and output the converted radio signal to an external device through the antenna ANT. An input device 3400 is a device capable of inputting a control signal for controlling an operation of the host 2000 or data to be processed by the host 2000, and may be implemented as a pointing device such as a touch pad or a computer mount, a keypad, or a keyboard. The host 2000 may control an operation of the display 3200 such that data output from the memory controller 1200, data output from the radio transceiver 3300, or data output from the input device 3400 can be output through the display 3200.

Figure 14:
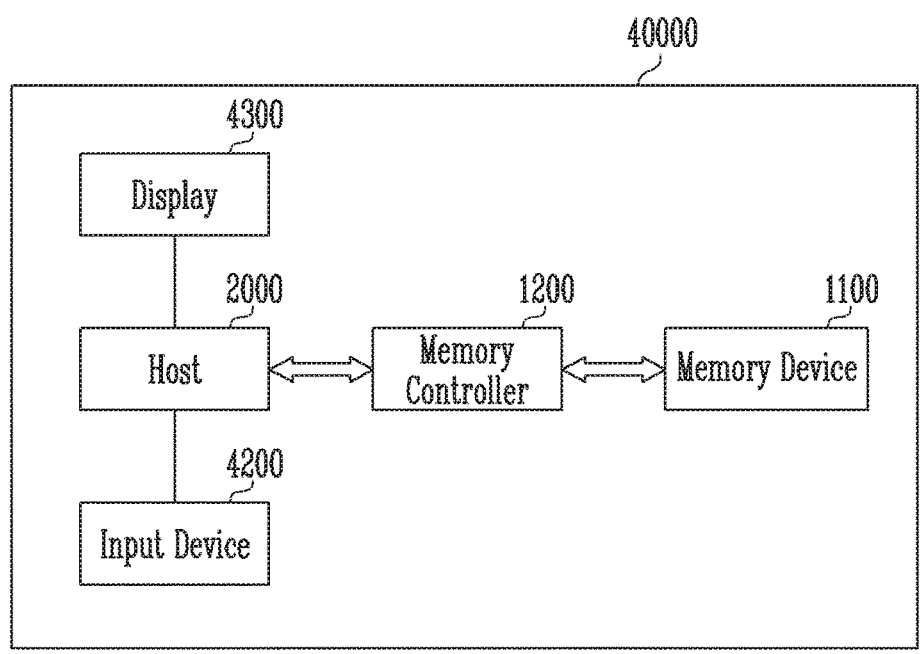
FIG. 14 is a diagram illustrating an embodiment of the memory system including the memory controller shown in FIG. 7.

FIG. 14 is a diagram illustrating another embodiment of the memory system including the memory controller shown in FIG. 7.

Referring to FIG. 14, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include a memory device 1100 and a memory controller 1200 capable of controlling a data processing operation of the memory device 1100.

A host 2000 may output data stored in the memory device 1100 through a display 4300 according to data input through an input device 4200. For example, the input device 4200 may be implemented as a pointing device such as a touch pad or a computer mouse, a keypad, or a keyboard.

The host 2000 may control the overall operations of the memory system 40000, and control an operation of the memory controller 1200.

Figure 15:
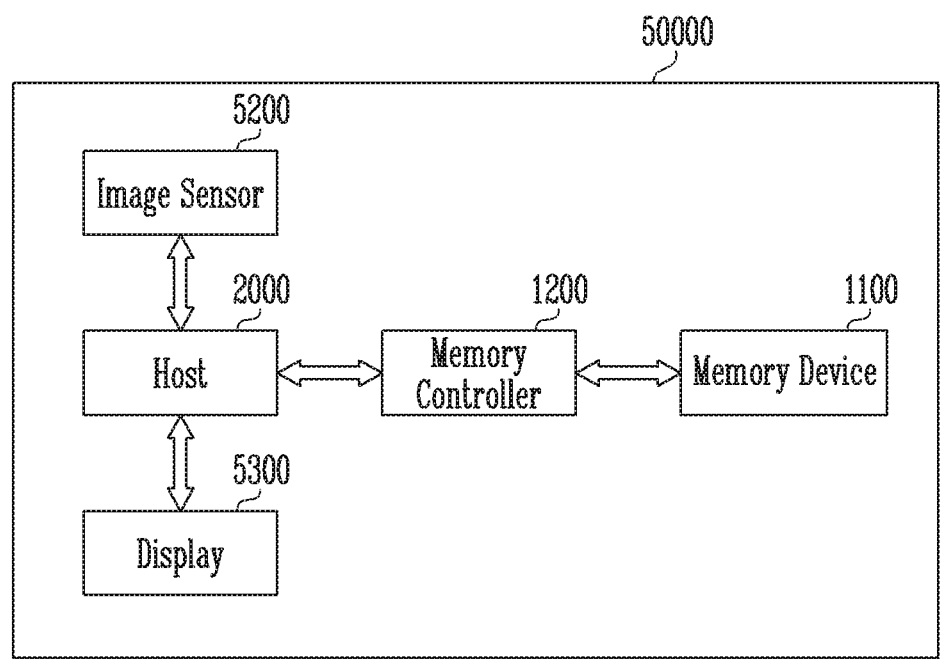
FIG. 15 is a diagram illustrating an embodiment of the memory system including the memory controller shown in FIG. 7.

FIG. 15 is a diagram illustrating another embodiment of the memory system including the memory controller shown in FIG. 7.

Referring to FIG. 15, the memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include a memory device 1100 and a memory controller 1200 capable of controlling a data processing operation of the memory device 1100, e.g., a program operation, an erase operation, or a read operation.

An image sensor 5200 of the memory system 50000 may convert an optical image into digital signals, and the converted digital signals may be transmitted to a host 2000 or the memory controller 1200. Under the control of the host 2000, the converted digital signals may be outputted through a display 5300, or be stored in the memory device 1100 through the memory controller 1200. In addition, data stored in the memory device 1100 may be outputted through the display 5300 under the control of the host 2000.

Figure 16:
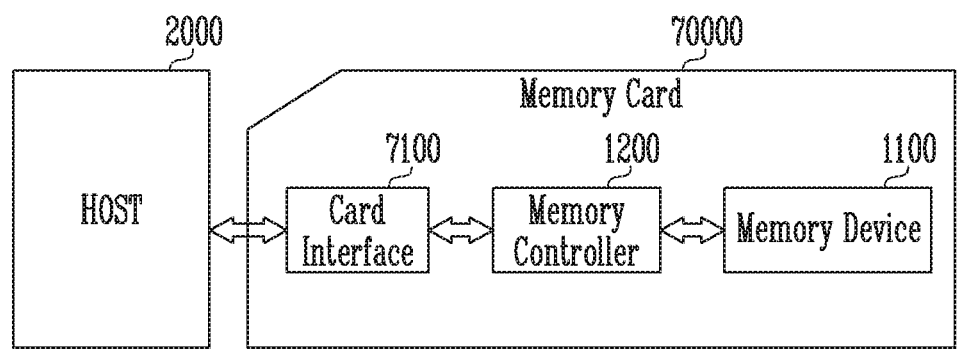
FIG. 16 is a diagram illustrating an embodiment of the memory system including the memory controller shown in FIG. 7.

FIG. 16 is a diagram illustrating another embodiment of the memory system including the memory controller shown in FIG. 7.

Referring to FIG. 16, the memory system may include a host 2000 and a memory card 70000.

The memory card 70000 may be implemented with a smart card. The memory card 70000 may include a memory device 1100, a memory controller 1200, and a card interface 7100.

The memory controller 1200 may control data exchange between the memory device 1100 and the card interface 7100. In some embodiments, the card interface 7100 may be a Secure Digital (SD) card interface or a Multi-Media Card (MMC) interface, but the present disclosure is not limited thereto. Also, the card interface 7100 may interface data exchange between a host 2000 and the memory controller 1100 according to a protocol of the host 2000. In some embodiments, the card interface 7100 may support a Universal Serial Bus (USB) protocol and an Inter-Chip (IC)-USB protocol. The card interface 7100 may mean hardware capable of supporting a protocol used by the host 2000, software embedded in the hardware, or a signal transmission scheme.

In accordance with the present disclosure, a command queue is controlled according to operating characteristics, so that the time required to perform a multi-plane operation of simultaneously operating a plurality of planes can be reduced.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory controller comprising:
   an operation table configured to store operation information on various operations;
   a command queue controller configured to match commands performed in the same memory device according to an address, and queue the matched commands, based on the operation information; and
   a command register configured to sequentially store and output the queued commands,
   wherein the operation table includes program operation information, read operation information, and erase operation information,
   wherein the read operation information includes information on logical pages, and
   wherein the information on logical pages includes least significant bit (LSB) information, central significant bit (CSB) information, and most significant bit (MSB) information.

2. The memory controller of claim 1, wherein the program operation information includes information on a single level cell (SLC) method, a multi-level cell (MLC) method, a triple level cell (TLC) method, and a quadruple level cell (QLC) method.

3. The memory controller of claim 1, wherein the read operation information further includes information on an SLC method, an MLC method, a TLC method, and a QLC method.

* * * * *